United States Patent [19]

Logullo, Sr. et al.

[11] Patent Number: 4,678,821

[45] Date of Patent: Jul. 7, 1987

[54] COMPOSITES

[75] Inventors: Francis M. Logullo, Sr., Hockessin, Del.; Yun-Tai Wu, Newtown Square, Pa.; George E. Zahr, Wilmington, Del.

[73] Assignee: E. I. Du Pont de Nemours and Company, Wilmington, Del.

[21] Appl. No.: 739,861

[22] Filed: May 31, 1985

[51] Int. Cl.$^4$ .............................................. C08K 9/00
[52] U.S. Cl. ................................. 523/205; 428/288; 428/292; 428/293; 428/379; 428/375; 428/413; 523/455
[58] Field of Search ............... 428/292, 293, 379, 375, 428/288, 413; 523/205, 204, 455

[56] References Cited

U.S. PATENT DOCUMENTS

| 3,462,296 | 8/1969 | Raynolds et al. | 117/161 |
|---|---|---|---|
| 3,560,382 | 2/1971 | Finch | 428/484 |
| 4,142,017 | 2/1979 | Blackburn | 428/284 |
| 4,265,981 | 5/1981 | Campbell | 428/591 |
| 4,325,857 | 4/1982 | Champaneria et al. | 523/412 |
| 4,337,155 | 6/1982 | Sasaki et al. | 428/395 |
| 4,351,880 | 9/1982 | Fukui et al. | 428/378 |

FOREIGN PATENT DOCUMENTS 204974 11/1984 Japan ................................. 428/395

OTHER PUBLICATIONS

Mumford et al. "Matrix/Fiber Interface Effects on Kevlar Pressure Vessel Performance", 18th Joint Propulsion Conference, Cleveland, Ohio, 1982, pp. 1–3.

Kulkarni, "New Applications for Filament Winding" *Machine Design*, pp. 67–71.

*Primary Examiner*—Lorraine T. Kendell
*Assistant Examiner*—S. A. Gibson

[57] ABSTRACT

A rigid composite of an epoxy resin matrix reinforced with continuous filaments of a p-aramid coated with an adhesion modifier.

4 Claims, No Drawings

COMPOSITES

BACKGROUND OF THE INVENTION

Mumford et al. described the use of Kevlar 49 ® in filament wound pressure vessels in a note from the AIAA/SAE/ASME 18th Joint Propulsion Conference, June 21-23, 1982, Cleveland, Ohio. For such application the filaments are ordinarily embedded in an epoxy resin matrix. Mumford et al. report that the fiber stress performance in the filament wound pressure vessel is lower than the nominal strand tensile strength. One way suggested in the article for utilization of a higher fraction of the fiber ultimate strength is coating the fiber with from 5 to 9% of a silicone release agent before application of the epoxy resin. This system has deficiencies and is not employed in polar windings of the pressure vessels. The present invention overcomes certain of these deficiencies and provides unusually high impact resistance to pressure vessels.

SUMMARY OF THE INVENTION

A rigid composite comprising an epoxy resin matrix reinforced with continuous p-aramid filaments coated with from about 0.2 to 2 percent by weight of a solid adhesion modifier, said coated filaments when embedded in an epoxy matrix and tested in accordance with ASTM D2344-7.6 exhibit a short beam shear strength (SBSS) for the composite of between about 2.5 and 5.5 Kpsi. Preferably the adhesion modifier is a 2-perfluoroalkylethyl ester or paraffin wax. Generally from about 20 to 80 percent by volume of filaments is present based on the weight of the composite.

DETAILED DESCRIPTION OF THE INVENTION

This invention relates to continuous filament reinforced, rigid composites. High tenacity, high modulus p-aramid filaments are useful for such composites.

The term "aramid" is used to designate wholly aromatic polyamides. Not all aramid fibers are useful in the present invention but only those derived from aromatic polyamides whose chain extending bonds are either coaxial or parallel and oppositely directed. Minor amounts of units whose chain extending bonds are not oppositely directed, e.g., meta-oriented bonds, may be present provided the filament tenacity and modulus are not unduly reduced. High strength, high modulus aramid fibers useful in the present invention may be prepared by the processes described in U.S. Pat. Nos. 3,767,756, 3,869,430 and 4,075,172. The fibers are characterized by filament tenacities of at least 15 gpd (13.2 dN/tex) and moduli of at least 400 gpd (354 dN/tex). These fibers will be referred to hereinafter as p-aramid fibers. Particularly preferred are p-aramid fibers based on poly(p-phenylene terephthalamide) as produced by Du Pont under the trademarks Kevlar ®.

The matrix component of the composite of the invention is an epoxy resin. Such materials are well known in the art and in the cured state provide strong rigid structures. Among suitable epoxy resins, there may be mentioned those from epichlorohydrin and bisphenol A. In the composites of the invention the p-aramid filaments are usually aligned within the epoxy resin matriix in the direction in which stress is to be applied. The filaments generally comprise from 20 to 80 percent by volume of the composite preferably from 60 to 80 percent by volume.

The advantages of the present invention are seen when the filaments before embedment have been coated with an adhesion modifier. The function of the modifier is to reduce the adhesion level between the p-aramid filaments and the epoxy matrix as discussed in greater detail below. From about 0.2 to 2 percent by weight of such modifier is applied to the filaments to achieve the desired SBSS value of between about 2.5 and 5.5 Kpsi. It may be applied in any of a variety of ways to provide even distribution on the surfaces of the filaments. For example, it may be dissolved in a solvent, applied to the filaments and the solvent driven off, or it may be dispersed in a carrier (e.g., water) and applied to the filaments, or it may be applied directly in the absence of other ingredients. One of the more common ways of application is from a dispersion of the adhesion modifier in water. In a generally useful way of preparing such a dispersion, the adhesion modifier is melted or dissolved in an organic solvent (e.g., methylisobutyl ketone) and mixed with an aqueous solution of the dispersing agent, yielding a two-phase mixture. The mixture is stirred under high shear (e.g., in a Waring blender) to yield a dispersion. The organic solvent is stripped off by distillation under vacuum; the residual mixture is the desired aqueous dispersion. Suitable dispersing agents are "Armeen" 14D and 18D, "Merpol" OJS, "Arquad" 1250, "Merpol" HC5, sodium dodecylbenzenesulfonate, "Avitex" DN-100, and octadecyl trimethylammonium chloride.

The adhesion modifier may be characterized as a solid which is not readily absorbed or dissolved in the filaments or resin. As a solid it will have less tendency to migrate during preparation of the composite or in use. It is important that the modifier reduce the adhesion between fiber and matrix to limit transverse loading which tends to prevent maximum utilization of ultimate fiber strength. On the other hand the reduction in adhesion should not be so great that the load of broken filaments cannot be redistributed through the matrix polymer to other filaments. With the composites under consideration it has been found that the desirable qualities are achieved if at the low modifier add-on level specified, i.e., between about 0.2% to 2% by wt., the short beam shear strength is between 2.5 and 5.5 Kpsi (thousand pounds per square inch) when a unidirectional flat specimen is measured in accordance with ASTM D2344-76.

One advantage of obtaining the desired adhesion values at low add-on levels is that there is overall weight reduction of the composite as compared to those amounts of silicone materials reported in the art. Another is that low add-on permits a greater concentration of filaments based on the weight of the composite. Two groups of surface modifiers for p-aramid filaments useful for this invention are certain fluorochemicals and paraffin waxes. The fluorochemicals may be described as 2-perfluoroalkylethyl esters where the 2-perfluoroalkylethyl group has the structure $C_nF_{2n+1}(CH_2)_2$—and $n=5-11$. The esters exemplified herein are those of methacrylic acid in polymeric form, citric acid urethane, and phosphoric acid or its ammonium salts. Esters of this type are shown in U.S. Pat. Nos. 3,282,905, 3,378,609 and others.

The present invention is particularly useful in filament wound pressure vessels. Such vessels can tolerate impact and withstand pressure better if the reinforcing filaments have been coated in accordance with this invention prior to being incorporated in the epoxy resin matrix than when uncoated filaments have been used. Use of these coatings also avoids the problems associated with application of liquid silicone release agents as used in the art. The latter require extensive drying or curing periods, and are messy to use. They are generally employed in large amounts, i.e., 5 to 9% (see Mumford et al. supra), thus adding undesirable weight to the composite. It is also understood that the frictional qualities of such silicone coated yarn discourage use of the yarn in polar windings of pressure vessels.

It will be understood that the examples below are believed to be representative of the present invention. Further, a change in the amount of add-on might bring the short beam shear strength value outside of the desired range of 2.5 to 5.5 Kpsi.

EXAMPLES

Examples 1-4 are all unidirectional, filament wound composites comprised of epoxy resin and adhesion modified p-aramid yarns. The examples differ from each other in the nature and amount of the adhesion modifier (see Table I). The adhesion modified yarns were prepared by combining four ends of p-aramid yarn (1,140 denier-768 filaments; Kevlar ® 49 manufactured and sold by E. I. du Pont de Nemours and Company; standard producer-applied finish), dipping in an aqueous dispersion of the appropriate adhesion modifier, drying by passing through an oven at 200° C. (about 2 min. residence time) and winding on a package. The amount of adhesion modifier applied to the yarn was controlled by diluting the aqueous dispersions of the modifier to the appropriate level.

The composites are all prepared in the same manner from the various adhesion-modified yarns by tensioning and dipping the yarns in a composition of 100 parts by weight of an epoxy resin (EPON 826, Shell), 25 parts by weight of 1,4-butanediol diglycidyl ether (RD-2, Ciba Giegy) and 30 parts by weight of an amine curing agent (TONOX 60/40, Naugatuck Chem. Co.) such that the composition was 60 volume percent fiber and winding the wet yarn on a rectangular mold.

The rectangular mold had two cavities 6" long×½" wide×⅛" deep and resin coated yarn was wound into these cavities. Two cover plates were laid on the cavities and screws were partially tightened to hold the cover plates to the mold. Four shims (⅛" thick) were placed between the mold and the cover plates to give desirable sample thickness.

The complete mold was then placed in a vacuum chamber at room temperature and 25 inch vacuum for 30 minutes to degas the resin. All screws were tightened and the sample cured in two steps (120° C. for 90 min. and 175° C. for 60 min.).

The cured composites were cooled down to ambient temperature. The screws and cover plates of the molds were removed. (All metals parts were sprayed with mold release before winding for easy disassembly).

The composite was cut with a saw to give two unidirectional filament wound flat laminate samples 6" long×½" wide×⅛" thick. Fiber volume is 60±4%. All fiber was aligned in the length direction.

The shear strength of the composites was tested by the ASTM Short-Beam Method D-2344-76 (pp. 381-384 of *Annual Book of ASTM Standards, Part 36*, 1977 Edition). Sample size was 0.5 in. wide, about 0.125 in. thick, and 3.0 in. long (span length to depth ratio of 4/1). Four specimens of each composite were tested after conditioning. The short-beam shear strength (SBSS) was calculated from the breaking load and sample dimensions and is listed for each Example in Table I.

A control (Sample A) was made similarly to Example 1-4 except that no additional adhesion modifier was employed on the yarn other than the standard producer-applied finish.

TABLE I

Examples 1-4 and Sample A

| Example | Adhesion Modifier on Kevlar ® 49 | Dispersing Agents For Modifier | % Add-On | SBSS (Kpsi) |
|---------|----------------------------------|-------------------------------|----------|-------------|
| 1. | a 56:100 mixture (by wt.) of a fluorochemical mixture and a wax paraffin mixture. The fluorochemical mixture was composed of two interpolymers, one interpolymer comprising 57% of total is derived from about 75% 2-perfluoroalkylethyl ester of methacrylic acid where the 2-perfluoroalkylethyl group has the formula, $C_nF_{2n+1}(CH_2)_2-$, and n has a value of from 5 to 11, about 25% 2-ethylhexyl methacrylate, about 0.25% N—methylolacrylamide and about 0.25% 2-hydroxyethyl-methacrylate; the second interpolymer, comprising 43% of the total, is derived from about 97-98% of 2-ethylhexyl methacrylate, 2% N—methylol acrylamide and 0-1% ethylenedimethacrylate. The wax paraffin mixture was comprised of 50% of a wax paraffin derived from petroleum and 50% of a derivative of melamine having the following formula: | "Armeen" 14D & "Armeen" 18D | 0.5 | 4.4 |

TABLE I-continued

Examples 1-4 and Sample A

| Example | Adhesion Modifier on Kevlar ® 49 | Dispersing Agents For Modifier | % Add-On | SBSS (Kpsi) |
|---|---|---|---|---|
| | $$R-C\underset{N}{\overset{N}{\underset{\|}{\diagdown}}}\overset{}{\underset{C}{\diagup}}C-R$$ where R is: $-N\diagup^{CH_2-OCH_3}_{\diagdown CH_2-O-CO-C_{21}H_{43}}$ | | | |
| 2. | 2-Perfluoroalkylethyl ester of citric acid urethane derived from 1,6 hexamethylene diisocyanate and tri(2-perfluoroalkylethyl) citrate where the 2-perfluoroalkylethyl group has the formula given in Example 1. | Sodium Dodecylbenzene Sulfonate | 0.4 | 4.8 |
| 3. | A 3/1 mixture (by wt.) of wax paraffin derived from petroleum and a copolymer of stearyl methacrylate (70%) and diethylaminoethyl methacrylate (30%). | Octadecyl Trimethyl- ammonium Chloride | 0.9 | 5.1 |
| 4. | Mixture of ammonium salts of mono and bis-2-perfluoroalkylethyl phosphate esters (1:1 mono to bis ratio) where 2-perfluoro- alkylethyl group is the same of that of Example 1. | "Avitex" DN-100 | 0.3 | 5.1 |
| Sample A | None | — | — | 7.6 |

EXAMPLE 5

This Example describes the preparation of a composite in the form of a filament-wound pressure vessel. The pressure vessel was prepared and tested as described in ASTM Method D-2585-68 (Reapproved 1974), Procedure A [*Annual Book of ASTM Standards* (1977), Part 36].

Adhesion-modified p-aramid yarn (1140 denier, 768 filaments Kevlar ® 49) was prepared by applying 1.4 weight percent (dry basis) of the modifier described in Example 1 (Table I) to the yarn on the spinning machine in place of the conventional finish. The modifier was applied as an aqueous dispersion via a kiss-roll applicator.

The sand mandrel upon which the yarn was wound to form the pressure vessel was prepared as described in ASTM Method D-2585 p. 479 and has the dimensions shown in FIG. 1, p. 477. The metal polar bosses were attached to the mandrel and a release agent was sprayed onto the mandrel. A polyurethane rubber line was put on the mandrel, and the mandrel was attached to a computer controlled filament winder. The adhesion-modified yarn described above was prepreged with epoxy resin (UF3298 Thiokol; 35±2% resin based on weight of yarn) and wound on the mandrel starting with two polar (helical) plies followed by three hoop plies. The polar to hoop stress ratio created was 0.85. The whole system was cured in an oven for 3 hrs. at 120° F. followed by 4 hrs. at 250° F. After the system cooled, water was poured into the vessel to dissolve the mandrel binder and flush the sand and the release agent out. The vessel was dried, weighed, and pressurized in a hydrotest confinement, and the burst pressure was measured. Five vessels were made and burst to establish statistically reliable data. The average burst pressure was 3601 psi and the average calculated PVc/Wc [Burst Pressure (psi) X Volume of Composite (in$^3$)/Weight of Composite (Lb.)] was $1.79 \times 10^6$ in. The calculated hoop stress using netting analysis was 447 Kpsi.

Control Sample B

A control filament-wound pressure vessel was prepared similarly to Example 5 with the exception that the yarn contained no special adhesion modifier, but only the standard commercial finish. Five vessels were prepared and tested. The average burst pressure was 2957 psi and the average calculated PVc/Wc was $1.27 \times 10^6$ in. The calculated hoop stress using netting analysis was 367 Kpsi.

EXAMPLE 6

This example is similar to Example 5 except that the finished mandrel and, hence, the pressure vessel was larger (mandrel diameter, 6.68 in. and cylinder length, 5.24 in) and the mandrel winding sequence, epoxy resin, and curing cycle were different as detailed below.

The adhesion modified yarn was prepreged with epoxy resin (LRF 216 Brunswick Co.; 35±2% resin based on a weight of yarn) and wound on the mandrel with the following sequence; one hoop layer, one polar layer, polar domes, one hoop layer, one polar layer, one and a half hoop layer, one polar layer, and one hoop layer. The polar-to-hoop stress ratio created was 0.83. The whole system was cured in an oven for 18 hrs. at 125° F., 2 hrs. at 175° F. and 11 hrs. at 210° F. The mandrel was removed, and the pressure vessel was dried and tested as in Example 5. Four vessels were made and burst to establish statistically reliable data. The average burst pressure was 6688 psi, the average calculated PVc/Wc as $1.410 \times 10^6$ in., and the calculated hoop stress using netting analysis was 515 Kpsi.

The average short-beam-shear-strength of flat laminates from adhesion-modified p-aramid yarn of Examples 5 and 6 was 3.4 Kpsi when measured in accordance with ASTM 2344-76. The flat laminates were made and tested in the same manner described for Examples 1–4.

Control Sample C

A control filament-wound pressure vessel was prepared similarly to Example 6 with the exception that the yarn contained no special adhesion modifier, but only the standard finish applied to the commercial yarn. Four pressure vessels were made and tested which gave an average burst pressure of 5032 psi, an average PVc/Wc of $1.063 \times 10^6$ in. and a calculated hoop stress of 388 Kpsi.

What is claimed is:

1. A rigid composite comprising an epoxy resin matrix reinforced with continuous p-aramid filaments coated with from about 0.2 to 2 percent by weight of a solid adhesion modifier, said coated filaments when embedded in an epoxy matrix and tested in accordance with ASTM D234476 exhibit a short beam shear strength of between about 2.5 and 5.5 Kpsi.

2. A composite according to claim 1 wherein the filaments comprise from 20 to 80 percent by volume of the composite.

3. A composite according to claim 1 wherein the adhesion modifier comprises a 2-perfluoroalkyl-ethyl ester.

4. A composite according to claim 1 wherein the adhesion modifier comprises a paraffin wax.

* * * * *